United States Patent
Sugita et al.

(10) Patent No.: US 10,581,084 B2
(45) Date of Patent: Mar. 3, 2020

(54) METHOD OF ACTIVATING CATALYST FOR FUEL CELL

(71) Applicant: TOYOTA JIDOSHA KABUSHIKI KAISHA, Toyota-shi, Aichi-ken (JP)

(72) Inventors: Kazumi Sugita, Nisshin (JP); Kosuke Katsuta, Toyota (JP); Naotoshi Miyamoto, Seto (JP); Shigemitsu Nomoto, Nisshin (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 4 days.

(21) Appl. No.: 15/835,751

(22) Filed: Dec. 8, 2017

(65) Prior Publication Data

US 2018/0166691 A1 Jun. 14, 2018

(30) Foreign Application Priority Data

Dec. 13, 2016 (JP) ................. 2016-241404

(51) Int. Cl.
| | |
|---|---|
| *H01M 8/04223* | (2016.01) |
| *H01M 4/86* | (2006.01) |
| *H01M 8/04746* | (2016.01) |
| *H01M 8/04089* | (2016.01) |
| *H01M 8/0438* | (2016.01) |
| *H01M 4/92* | (2006.01) |

(52) U.S. Cl.
CPC ........... *H01M 4/86* (2013.01); *H01M 8/0441* (2013.01); *H01M 8/04089* (2013.01); *H01M 8/04223* (2013.01); *H01M 8/04753* (2013.01); *H01M 4/92* (2013.01)

(58) Field of Classification Search
CPC ............. H01M 8/04298; H01M 8/043; H01M 8/04313; H01M 8/0438; H01M 8/0441; H01M 8/04694; H01M 8/04746; H01M 8/04761
See application file for complete search history.

(56) References Cited

U.S. PATENT DOCUMENTS

| | | | |
|---|---|---|---|
| 2005/0255346 A1* | 11/2005 | Ueda ................ | H01M 8/04223 429/429 |
| 2006/0008689 A1* | 1/2006 | Yonekura .......... | H01M 8/04089 429/415 |
| 2015/0207159 A1 | 7/2015 | Matsusue et al. | |

FOREIGN PATENT DOCUMENTS

| | | |
|---|---|---|
| JP | 2006-139935 | 6/2006 |
| JP | 2008-130358 | 6/2008 |
| JP | 2008-204799 | 9/2008 |
| JP | 2014-82115 | 5/2014 |

\* cited by examiner

*Primary Examiner* — Christina Chern
(74) *Attorney, Agent, or Firm* — Finnegan, Henderson, Farabow, Garret & Dunner, LLP

(57) ABSTRACT

A method of activating a catalyst for a fuel cell in order to perform catalyst activation in a cathode electrode of the fuel cell includes a first process in which hydrogen is supplied into an anode electrode, the side of an air supply line of the cathode electrode is sealed, and the side of an air exhaust line of the cathode electrode is opened to an atmosphere, a second process in which the side of the air exhaust line of the cathode electrode is sealed after the first process, and a third process in which catalyst activation is performed in the cathode electrode after the second process.

2 Claims, 9 Drawing Sheets

METHOD OF ACTIVATING CATALYST FOR FUEL CELL

INCORPORATION BY REFERENCE

The disclosure of Japanese Patent Application No. 2016-241404 filed on Dec. 13, 2016 including the specification, drawings and abstract is incorporated herein by reference in its entirety.

BACKGROUND

1. Technical Field

The present disclosure relates to a method of activating a catalyst for a fuel cell in order to perform catalyst activation in a cathode electrode of a fuel cell.

2. Description of Related Art

A fuel cell has a structure in which a plurality of fuel single cells are connected in series. In addition, the fuel cell has a structure in which an electrolyte film is disposed between an anode electrode and a cathode electrode and generates power by reacting hydrogen gas supplied to the anode electrode with air (oxygen gas) supplied to the cathode electrode through the electrolyte film.

In addition, on surfaces of the anode electrode and the cathode electrode on the side of the electrolyte film, a catalyst for facilitating the reaction is disposed. The catalyst includes catalyst particles of, for example, Pt.

Incidentally, on the side of the cathode electrode to which air is supplied, an oxide film generated by an oxidation reaction of a catalyst and oxygen may be formed on a surface of the catalyst. When the oxide film is formed on the surface of the catalyst, a cell voltage of the fuel cell is lowered.

Thus, in the fuel cell, the oxide film formed on the surface of the catalyst for the cathode electrode is removed due to a reduction reaction, and catalyst activation for activating the catalyst for the cathode electrode is performed. For example, in Japanese Unexamined Patent Application Publication No. 2008-204799 (JP 2008-204799 A), in order to improve power generation performance of the fuel cell, the catalyst activation is performed after the fuel cell is assembled.

SUMMARY

When catalyst activation is performed on a cathode electrode after a fuel cell is assembled as in JP 2008-204799 A, it is thought that, for example, hydrogen is supplied into an anode electrode, air is removed from the cathode electrode, a differential pressure is applied between the anode electrode and the cathode electrode, hydrogen is cross-leaked from the anode electrode to the cathode electrode, a cell voltage is lowered to a reduction potential of an oxide film or less, and catalyst activation is performed.

However, even if air of the cathode electrode is removed temporarily, air may remain in an air exhaust line and the remaining air may flow back to the cathode electrode. In this case, on the side of the cathode electrode, since an amount of hydrogen cross leak decreases and an amount of cell voltage drop decreases, the cell voltage may not be lowered to a reduction potential or less and catalyst activation cannot be performed.

The present disclosure provides method of activating a catalyst for a fuel cell through which catalyst activation can be performed in a cathode electrode of a fuel cell by preventing air remaining in an air exhaust line from flowing back to a cathode electrode.

A method of activating a catalyst for a fuel cell according to an aspect of the present disclosure is a method of activating a catalyst for a fuel cell in order to perform catalyst activation in a cathode electrode of the fuel cell. The method includes a first process in which hydrogen is supplied into an anode electrode of the fuel cell, a side of an air supply line of the cathode electrode is sealed, and a side of an air exhaust line of the cathode electrode is opened to an atmosphere; a second process in which the side of the air exhaust line of the cathode electrode is sealed after the first process; and a third process in which the catalyst activation is performed after the second process.

According to the aspect of the present disclosure, since it is possible to prevent air remaining in the air exhaust line from flowing back to the cathode electrode, it is possible to provide a method of activating a catalyst for a fuel cell through which catalyst activation can be performed in a cathode electrode of a fuel cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Forms for implementing the present disclosure will be described below with reference to the appended drawings. However, the present disclosure is not limited to the following embodiments. In addition, the following description and drawings will be appropriately simplified for clarity of explanation.

The present embodiment is an example in which the present disclosure is applied to a catalyst activation process in which catalyst activation is performed on a cathode electrode of a fuel cell among procedures of a power generation examining process performed after a fuel cell is assembled.

Figure 1:
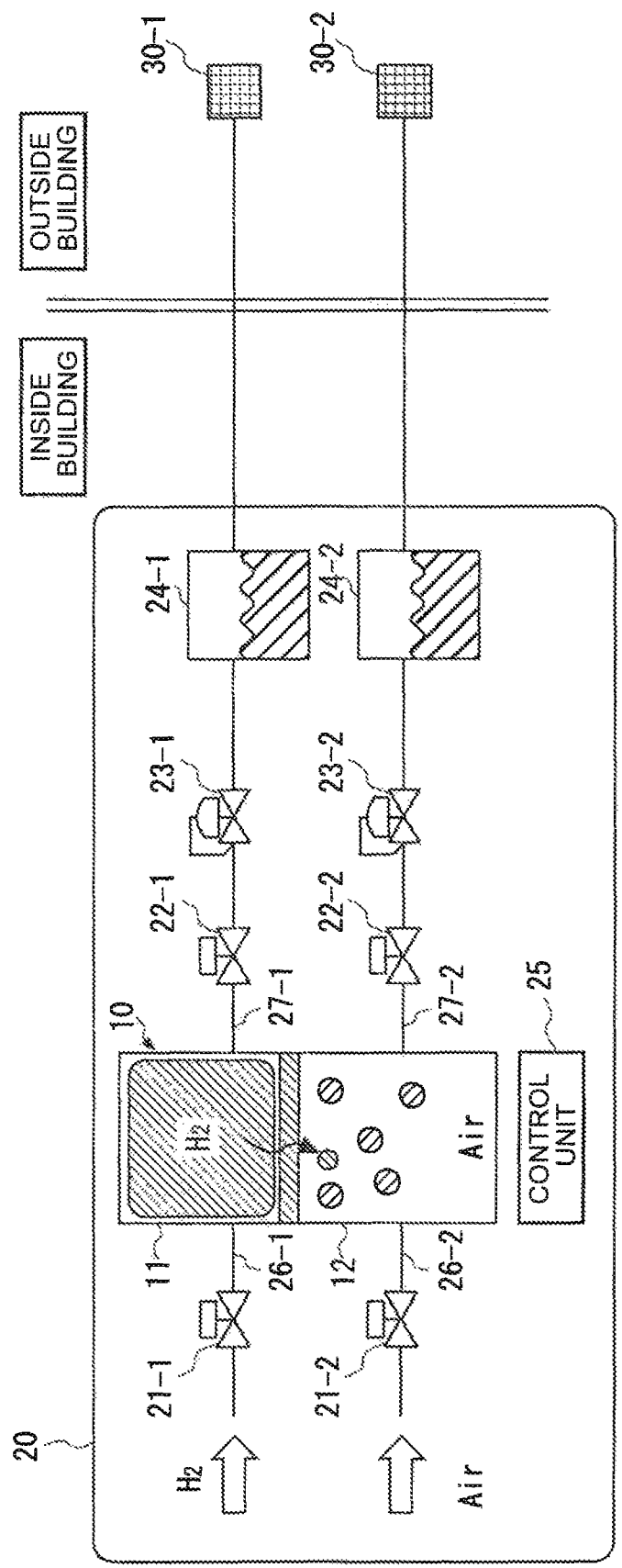
FIG. 1 is a diagram showing an example of a configuration of a power generation examining device.

First, a power generation examining device 20 used in a power generation examining process of a fuel cell 10 will be described with reference to FIG. 1. As shown in FIG. 1, the power generation examining device 20 includes a hydrogen supply valve 21-1, an air supply valve 21-2, a hydrogen exhaust valve 22-1, an air exhaust valve 22-2, back pressure valves 23-1 and 23-2, gas-liquid separators 24-1 and 24-2, and a control unit 25. Here, in FIG. 1, in order to avoid complicating the drawing, connection lines of the hydrogen supply valve 21-1, the air supply valve 21-2, the hydrogen exhaust valve 22-1, the air exhaust valve 22-2, and the back pressure valves 23-1 and 23-2 with the control unit 25 are omitted.

A hydrogen supply line 26-1 and a hydrogen exhaust line 27-1 through which hydrogen gas flows are connected to an anode electrode 11 of the fuel cell 10. An air supply line 26-2 and an air exhaust line 27-2 through which air (oxygen gas) flows are connected to a cathode electrode 12 of the fuel cell 10. Hydrogen gas supplied to the anode electrode 11 flows through the hydrogen supply line 26-1. Hydrogen gas discharged from the anode electrode 11 (used hydrogen gas; hereinafter the same) flows through the hydrogen exhaust line 27-1. Air supplied to the cathode electrode 12 flows through the air supply line 26-2. Air discharged from the cathode electrode 12 (used air; hereinafter the same) flows through the air exhaust line 27-2. Here, the fuel cell 10 is held by a holder (not shown), and is attached to the power generation examining device 20.

The hydrogen supply valve 21-1 is provided at the hydrogen supply line 26-1. The control unit 25 controls opening and closing of the hydrogen supply valve 21-1 and adjusts supply of hydrogen gas to the anode electrode 11. The air supply valve 21-2 is provided at the air supply line 26-2. The control unit 25 controls opening and closing of the air supply valve 21-2 and adjusts supply of air to the cathode electrode 12.

On the side of the anode electrode 11, hydrogen supplied as hydrogen gas is dissociated into electrons and protons ($H^+$) according to a reaction of the following Expression (1). Protons move toward the cathode electrode 12 through the electrolyte film, and electrons are emitted to an external load device (for example, a heater having a variable resistance function).

$$H_2 \rightarrow 2H^+ + 2e^- \qquad (1)$$

On the side of the cathode electrode 12, oxygen supplied as air, protons that have moved through the electrolyte film, and electrons that have returned from the external load device cause a reaction of the following Expression (2), and water is generated as a reaction product.

$$\tfrac{1}{2}O_2 + 2H^+ + 2e^- \rightarrow H_2O \qquad (2)$$

The hydrogen exhaust valve 22-1 is provided at the hydrogen exhaust line 27-1. The control unit 25 controls opening and closing of the hydrogen exhaust valve 22-1, and adjusts discharge of hydrogen gas from the anode electrode 11. The air exhaust valve 22-2 is provided at the air exhaust line 27-2. The control unit 25 controls opening and closing of the air exhaust valve 22-2 and adjusts discharge of air from the cathode electrode 12.

The back pressure valve 23-1 is provided downstream from the hydrogen exhaust valve 22-1 of the hydrogen exhaust line 27-1. The control unit 25 controls an opening degree of the back pressure valve 23-1 and adjusts a flow rate of hydrogen gas discharged from the anode electrode 11. The back pressure valve 23-2 is provided downstream from the air exhaust valve 22-2 of the air exhaust line 27-2. The control unit 25 controls an opening degree of the back pressure valve 23-2 and adjusts a flow rate of air discharged from the cathode electrode 12.

The gas-liquid separator 24-1 is provided downstream from the back pressure valve 23-1 of the hydrogen exhaust line 27-1, and separates moisture from hydrogen gas discharged from the anode electrode 11 and stores the moisture. The gas-liquid separator 24-2 is provided downstream from the back pressure valve 23-2 of the air exhaust line 27-2, and separates moisture from air discharged from the cathode electrode 12 and stores the moisture.

The control unit 25 outputs a control signal through connection lines (not shown), and thus controls opening and closing of the hydrogen supply valve 21-1, the air supply valve 21-2, the hydrogen exhaust valve 22-1, and the air exhaust valve 22-2 and controls an opening degree of the back pressure valves 23-1 and 23-2.

Here, the control unit 25 can include a processor such as a central processing unit (CPU), a memory, and other circuits in a hardware manner, and can be realized by a program loaded in a memory in a software manner. Thus, those skilled in the art can understand that the control unit 25 can be realized in various forms including only hardware, only software, or a combination thereof, and the forms are not limited. In addition, such a program can be stored using various types of non-transitory computer readable media and supplied to a computer. The non-transitory computer readable media include various types of tangible storage media. Exemplary non-transitory computer readable media include magnetic recording media (for example, a flexible disk, a magnetic tape, and a hard disk drive), magneto-optical recording media (for example, a magneto optical disc), a compact disc-read only memory (CD-ROM), a CD-Recordable (CD-R), a CD-ReWritable (CD-R/W), a semiconductor memory (for example, a mask ROM, a programmable ROM (PROM), an erasable PROM (EPROM), a flash ROM, and a random access memory (RAM)). In addition, the program may be supplied to a computer by various types of transitory computer readable media. Exemplary transitory computer readable media include an electrical signal, an optical signal, and electromagnetic waves. The transitory computer readable media can supply the program to a computer via a wired communication path such as an electric wire and an optical fiber or a wireless communication path.

In addition, on the most downstream side of the hydrogen exhaust line 27-1, an exhaust port 30-1 provided outside a building is connected. Hydrogen gas discharged from the anode electrode 11 to the hydrogen exhaust line 27-1 is finally discharged from the exhaust port 30-1 to the outside of the building. On the most downstream side of the air exhaust line 27-2, an exhaust port 30-2 provided outside the building is connected. Air discharged from the cathode electrode 12 to the air exhaust line 27-2 is finally discharged from the exhaust port 30-2 to the outside of the building. In addition, a flame arrester for preventing backfire is attached to the exhaust ports 30-1 and 30-2.

Figure 2:
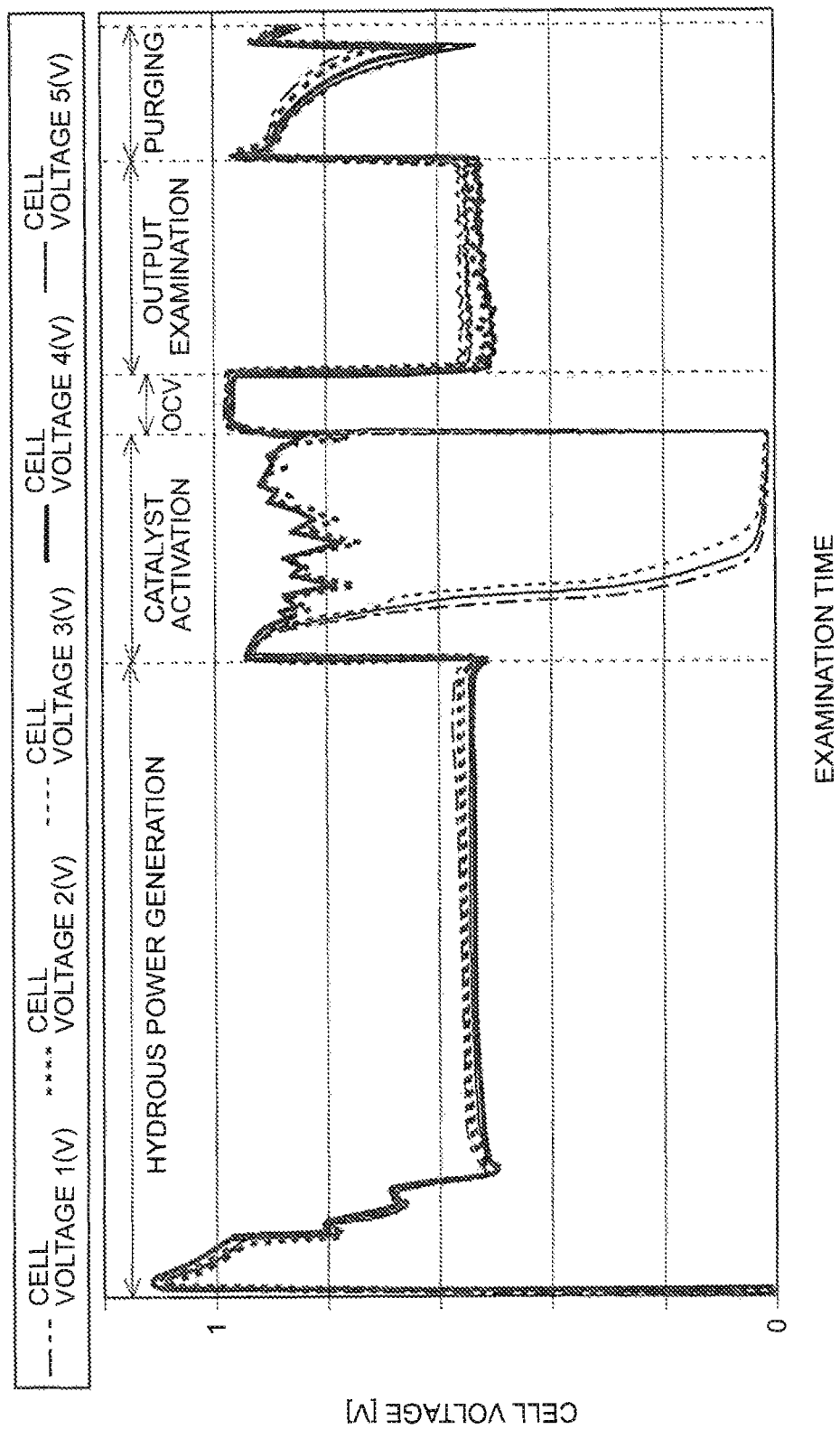
FIG. 2 is a diagram showing an example of cell voltages of five fuel cells when a catalyst activation method according to the present embodiment is not applied to a catalyst activation process of a fuel cell.

Next, an overall flow of the power generation examining process of the fuel cell 10 will be described with reference to FIG. 2. After assembly, the fuel cell 10 is attached to the power generation examining device 20 shown in FIG. 1 and a power generation examination is performed. FIG. 2 shows an example of cell voltages of five fuel cells 10 in procedures of the power generation examining process of the five fuel cells 10.

As shown in FIG. 2, in the power generation examining process of the fuel cell 10, a hydrous power generating process, a catalyst activation process, an open circuit voltage (OCV) examining process, an output examining process, and a purging process are performed in that order. The processes will be described below.

Hydrous Power Generating Process

Immediately after assembly, in the fuel cell 10, no proton (H) conductive path channel is formed on an electrolyte film, and it is not possible to exhibit original battery performance. Thus, in the hydrous power generating process, large amounts of hydrogen gas and air (oxygen gas) are supplied to the fuel cell 10, and while such gases contain much moisture, the fuel cell 10 is connected to a load device, a current is applied, and thus formation of a conductive path channel in the electrolyte film is facilitated.

Catalyst Activation Process

The catalyst activation process is a process in which an oxide film formed on a surface of a catalyst for the cathode electrode 12 of the fuel cell 10 is removed due to a reduction reaction, and catalyst activation for activating the catalyst is performed. The catalyst activation process will be described below in detail.

Output Examining Process

The output examining process is a process in which hydrogen gas and air are supplied to the fuel cell 10 and a cell voltage of the fuel cell 10 is examined. Before the output examining process, the hydrous power generating process is performed for all of the fuel cells 10. Thus, it is possible to cancel out different storage states (such as drying or wetting, and a leaving time) for each fuel cell 10, and it is possible to perform the output examining process under the same conditions.

OCV Examining Process

The OCV examining process is a process in which, while the fuel cell 10 is not connected to a load device, hydrogen gas and air are supplied to the fuel cell 10, and it is examined whether short-circuiting occurs.

Purging Process

The purging process is a preliminary process for removing the fuel cell 10 from the power generation examining device 20. In the purging process, a cell voltage of the fuel cell 10 is lowered in order to prevent electric shock, hydrogen gas is discharged from the fuel cell 10 in order to prevent hydrogen leakage, and hydrogen gas and air are supplied to the fuel cell 10 to replace a gas in the fuel cell 10 in order to remove water which is a reaction product from the fuel cell 10.

<Catalyst Activation Process of Fuel Cell>

Figure 3:
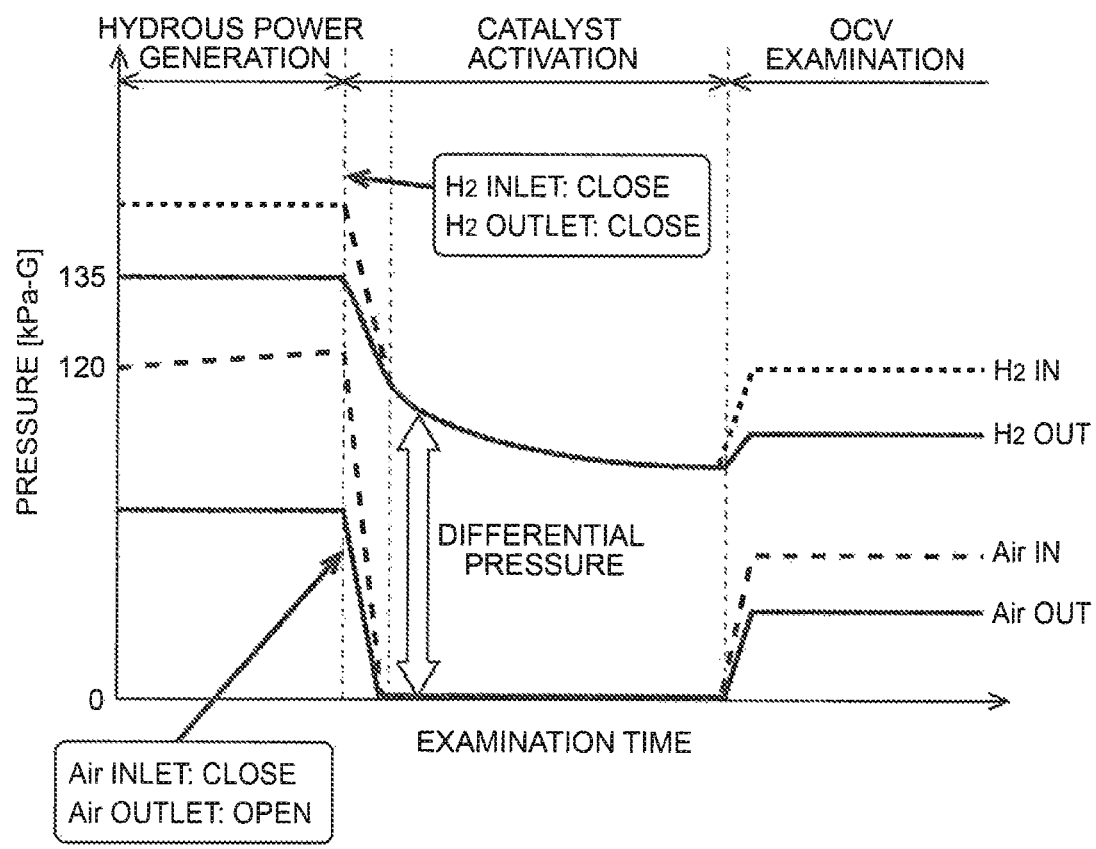
FIG. 3 is a diagram showing an example of pressures inside a fuel cell during a catalyst activation process of a fuel cell.
Figure 4:
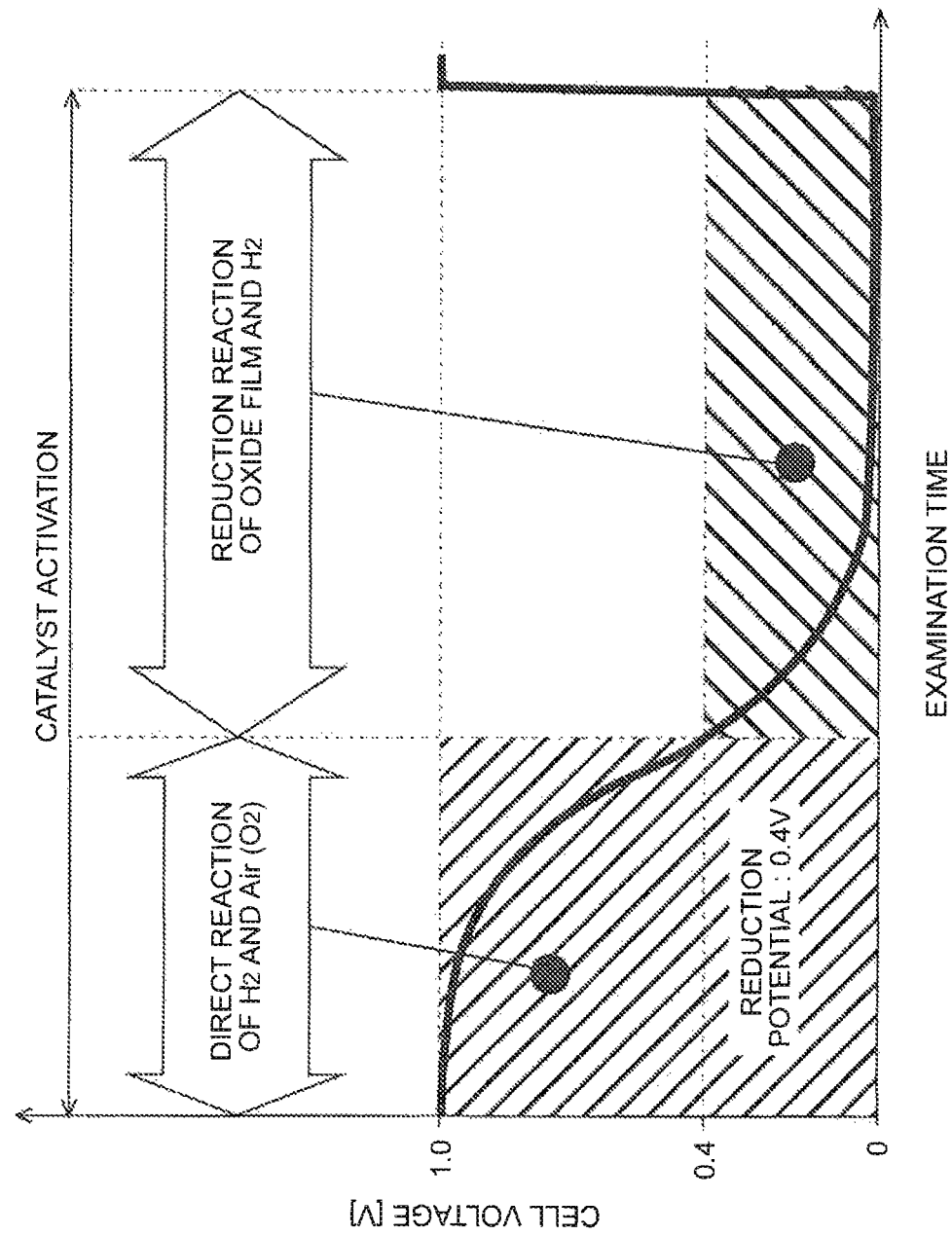
FIG. 4 is a diagram showing an example of a cell voltage during the catalyst activation process of a fuel cell.

Next, the catalyst activation process of the fuel cell 10 will be described in detail with reference to FIG. 3 to FIG. 5. FIG. 3 shows an example of pressures inside the fuel cell 10 during the catalyst activation process. A "H$_2$ IN" waveform shows a pressure on the side of the hydrogen supply line 26-1 of the anode electrode 11. A "H$_2$ OUT" waveform shows a pressure on the side of the hydrogen exhaust line 27-1 of the anode electrode 11, an "Air IN" waveform shows a pressure on the side of the air supply line 26-2 of the cathode electrode 12, and an "Air OUT" waveform shows a pressure on the side of the air exhaust line 27-2 of the cathode electrode 12. Here, the power generation examining device 20 includes four pressure sensors for measuring pressures of four parts inside the fuel cell 10. However, these pressure sensors are omitted in FIG. 1 in order to avoid complicating the drawing. In addition, FIG. 4 shows an example of a cell voltage of the fuel cell 10 during the catalyst activation process.

Figure 5:
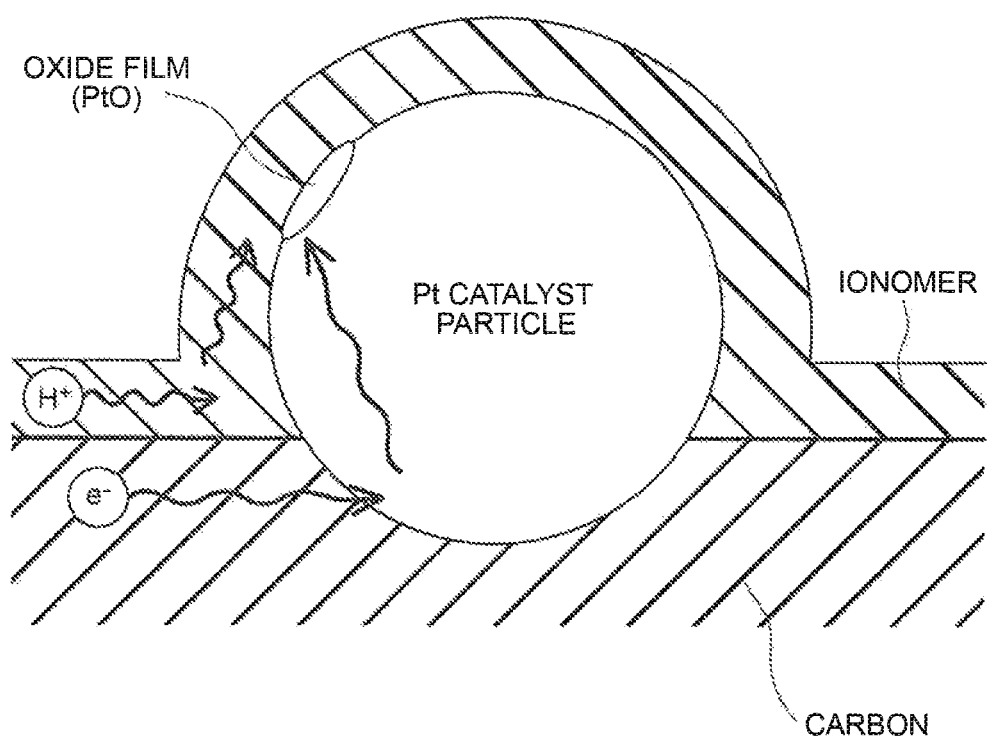
FIG. 5 is a diagram showing an example of a reduction reaction of an oxide film that occurs on a cathode electrode during the catalyst activation process of a fuel cell.

In addition, FIG. 5 shows an example of a reduction reaction of an oxide film that occurs on the side of the cathode electrode 12 during the catalyst activation process. The catalyst on the side of the cathode electrode 12 is supported by carbon and is covered with an ionomer that forms an electrolyte film. Here, the catalyst on the side of the cathode electrode 12 includes Pt catalyst particles containing Pt, and an oxide film containing PtO is formed on surfaces of the Pt catalyst particles. In addition, the oxide film has a reduction potential (0.4 V) at which a reduction reaction with protons is caused.

In addition, during the catalyst activation process, the fuel cell 10 is not connected to a load device, the control unit 25 stops controlling the back pressure valve 23-2, and an opening degree of the back pressure valve 23-2 is set to the maximum opening degree.

As shown in FIG. 3, when the catalyst activation process of the fuel cell 10 starts, the control unit 25 closes the hydrogen supply valve 21-1 (denoted as "H$_2$ inlet"; the same in FIG. 6) and the hydrogen exhaust valve 22-1 (denoted as "H$_2$ outlet"; the same in FIG. 6) together. Thus, hydrogen gas is supplied to the side of the anode electrode 11. In addition, the control unit 25 closes the air supply valve 21-2 (denoted as "Air inlet"; the same in FIG. 6) and opens the air exhaust valve 22-2 (denoted as "Air outlet"; the same in FIG. 6). Thus, in the cathode electrode 12, the side of the air supply line 26-2 is sealed, the side of the air exhaust line 27-2 is opened to an atmosphere, and air is discharged to the air exhaust line 27-2. As a result, since the pressure of the cathode electrode 12 is lowered to about zero on both the side of the air supply line 26-2 and the side of the air exhaust line 27-2, and a differential pressure is generated between the anode electrode 11 and the cathode electrode 12, hydrogen cross leak from the anode electrode 11 to the cathode electrode 12 occurs.

Thus, as shown in FIG. 4, on the side of the cathode electrode 12, hydrogen cross-leaked from the anode electrode 11 is directly reacted with oxygen, and a cell voltage of the fuel cell 10 is lowered. Then, when a cell voltage is lowered to 0.4 V or less which is a reduction potential of the oxide film, as shown in FIG. 5, the oxide film undergoes a reduction reaction of the following Expression (3) between protons that have moved through the electrolyte film and electrons that have returned to the load device via carbon. Thus, the oxide film formed on surfaces of Pt catalyst particles is removed and a catalyst layer is activated.

$$PtO+2H^{+}+2e^{-}\rightarrow Pt+H_2O \qquad (3)$$

However, the catalyst activation process of the fuel cell 10 is not necessarily ideally performed as described with reference to FIG. 3 to FIG. 5. In practice, in the example in FIG. 2, in two fuel cells 10 among the five fuel cells 10, during the catalyst activation process, an amount of cell voltage drop decreases (a cell voltage 2 and a cell voltage 4 in FIG. 2). Thus, in the two fuel cells 10, the cell voltage is not lowered to the reduction potential or less, and as a result, the reduction reaction does not occur and it is not possible to perform catalyst activation. In addition, since the two fuel cells 10 have an abnormal voltage waveform, the examination result is NG. However, the two fuel cells 10 are not actually defective products, and this NG examination result indicates erroneous detection of a defective product.

In order to find the reason why a cell voltage is not lowered in the two fuel cells 10 in FIG. 2 during the catalyst activation process, the inventors conducted an experiment of opening and closing the air exhaust valve 22-2 during the catalyst activation process for five fuel cells 10 similar to those in FIG. 2. The experimental results are shown in FIG. 6.

Figure 6:
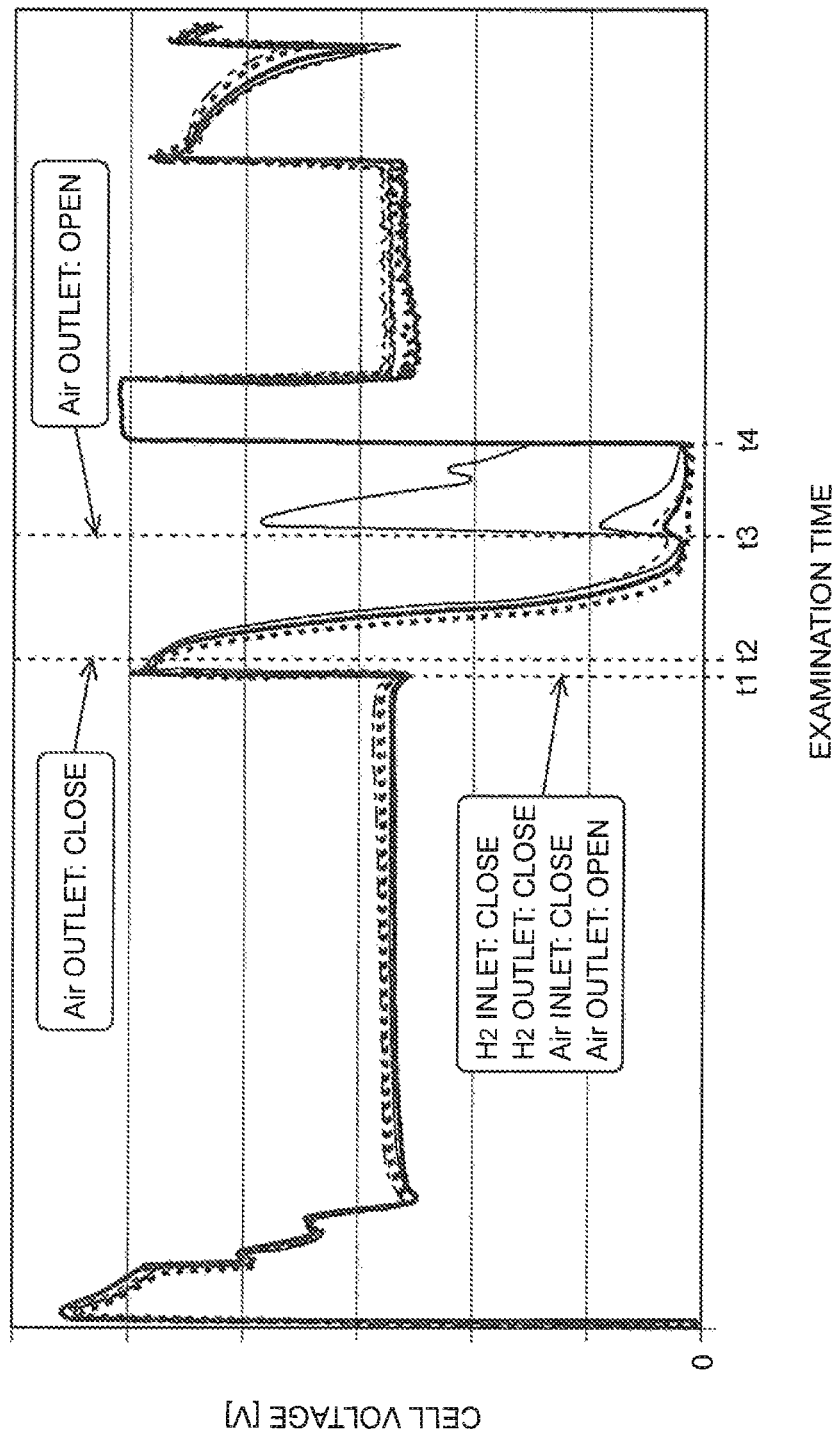
FIG. 6 is a diagram showing an example of results of an experiment in which an air exhaust valve is opened and closed during the catalyst activation process of a fuel cell.

As shown in FIG. 6, first, at time t1 at which the catalyst activation process of the fuel cell 10 starts, in the same manner as in FIG. 3, the hydrogen supply valve 21-1, the hydrogen exhaust valve 22-1, and the air supply valve 21-2 are closed, and the air exhaust valve 22-2 is opened. Thus, in the cathode electrode 12, the side of the air supply line 26-2 is sealed, and the side of the air exhaust line 27-2 is opened to an atmosphere.

Next, at time t2, while the hydrogen supply valve 21-1, the hydrogen exhaust valve 22-1, and the air supply valve 21-2 are closed, the air exhaust valve 22-2 is closed. Thus, the side of the air exhaust line 27-2 of the cathode electrode 12 is sealed. Then, thereafter, it is confirmed that a cell voltage is dropped in all of the five fuel cells 10 without flapping.

Next, at time t3, while the hydrogen supply valve 21-1, the hydrogen exhaust valve 22-1, and the air supply valve 21-2 are closed, the air exhaust valve 22-2 is opened again. Thus, the side of the air exhaust line 27-2 of the cathode electrode 12 is opened to an atmosphere again. Then, it is confirmed that a movement of a cell voltage is different in the five fuel cells 10 immediately after time t3, and at time t4 thereafter, a cell voltage sharply increases at the same timing.

Based on the experimental results in FIG. 6, as the reason why a cell voltage is not lowered in the two fuel cells 10 in FIG. 2 during the catalyst activation process, a phenomenon in which, since air remains in the air exhaust line 27-2 and the remaining air flows back to the cathode electrode 12, an amount of hydrogen cross leak decreases, and an amount of cell voltage drop decreases is thought to be the most probable reason.

Figure 7:
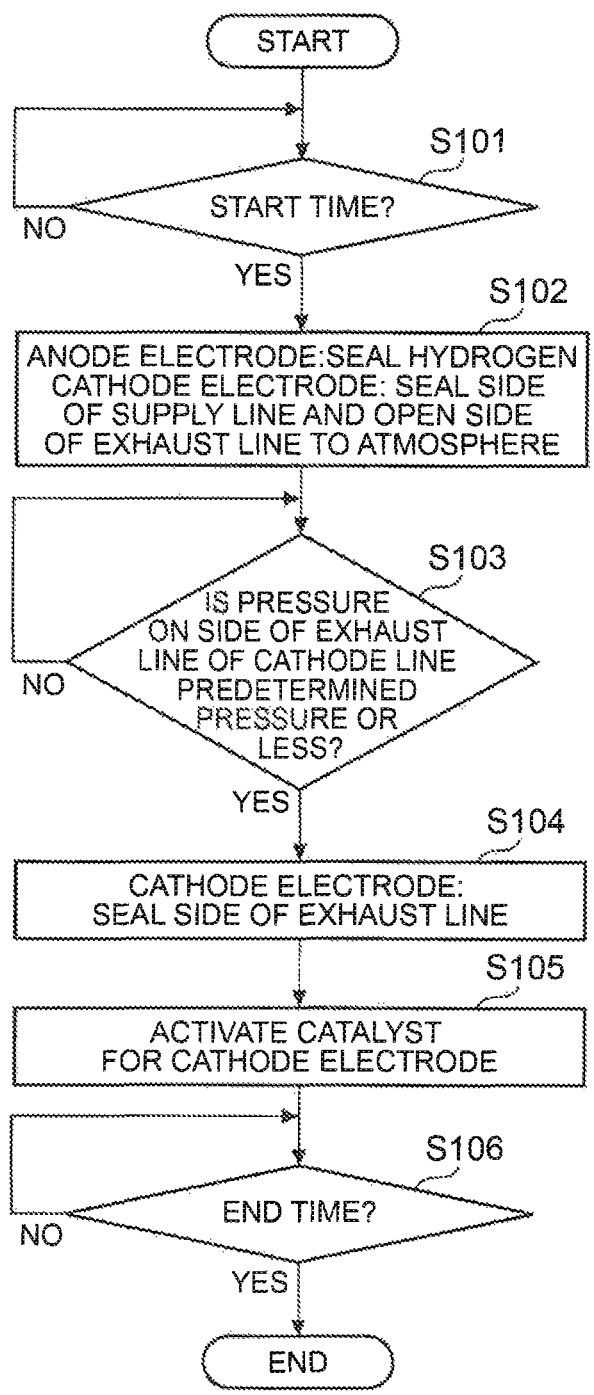
FIG. 7 is a flowchart showing an example of a method of activating a catalyst for a fuel cell according to the present embodiment.
Figure 8:
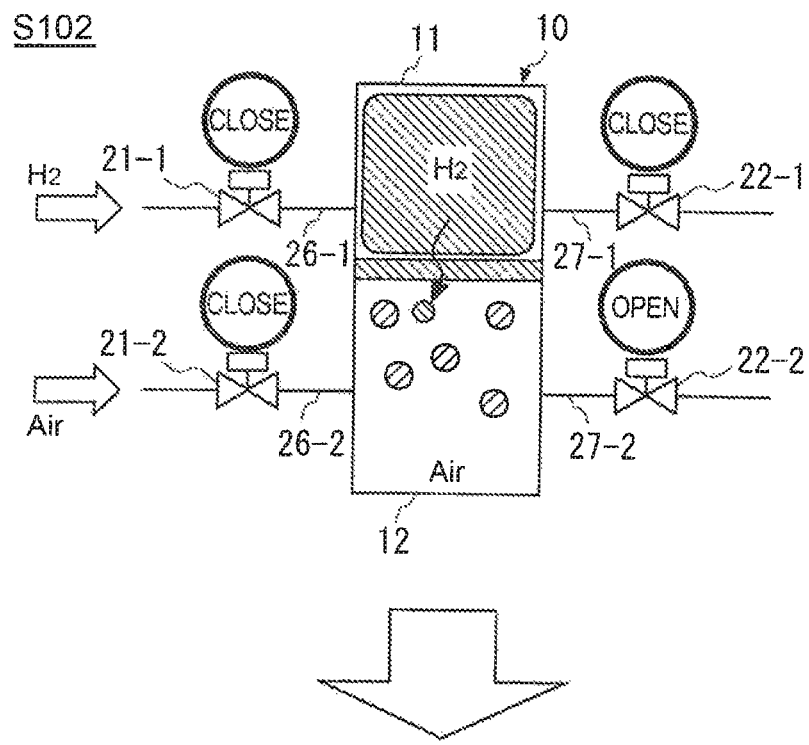
FIG. 8 is a schematic diagram schematically showing states of valves in Steps S102 and S104 in FIG. 7.
Figure 8:
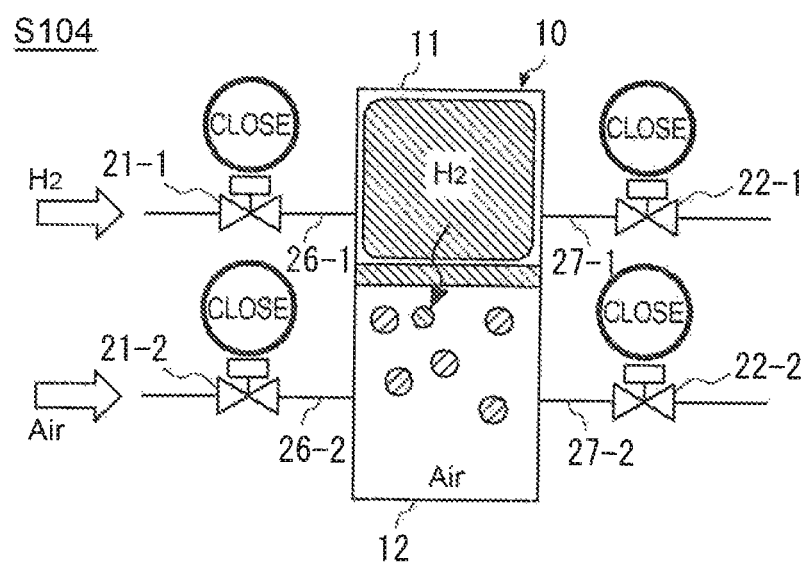

Here, in the present embodiment, the catalyst activation process of the fuel cell 10 is performed by a method shown in FIG. 7 and FIG. 8. FIG. 7 shows an example of a flow of a method of activating a catalyst for a fuel cell according to the present embodiment. FIG. 8 shows states of valves in Steps S102 and S104 in FIG. 7.

As shown in FIG. 7, when a start time of the catalyst activation process of the fuel cell 10 has arrived (YES in Step S101), the control unit 25 closes the hydrogen supply valve 21-1, the hydrogen exhaust valve 22-1, and the air supply valve 21-2 and opens the air exhaust valve 22-2. Thus, on the side of the anode electrode 1i, hydrogen gas is supplied. In the cathode electrode 12, the side of the air supply line 26-2 is sealed, and the side of the air exhaust line 27-2 is opened to an atmosphere, and air is discharged to the air exhaust line 27-2 (Step S102; the upper drawing in FIG. 8).

Next, the control unit 25 determines whether a pressure on the side of the air exhaust line 27-2 of the cathode electrode 12 is a predetermined pressure or less (Step S103). The predetermined pressure is a pressure of about zero, and is, for example, 5 kPa. In the present embodiment, when a pressure on the side of the air exhaust line 27-2 of the cathode electrode 12 is a predetermined pressure or less, it is determined that air has been removed from the cathode electrode 12.

In Step S102, when a pressure on the side of the air exhaust line 27-2 of the cathode electrode 12 is a predetermined pressure or less (YES in Step S103), the control unit 25 closes the air exhaust valve 22-2 while closing the hydrogen supply valve 21-1, the hydrogen exhaust valve 22-1, and the air supply valve 21-2. Thus, the side of the air exhaust line 27-2 of the cathode electrode 12 is sealed (Step S104; the lower drawing in FIG. 8).

Therefore, when the side of the air exhaust line 27-2 of the cathode electrode 12 is opened to an atmosphere, even if air discharged from the cathode electrode 12 to the air exhaust line 27-2 remains in the air exhaust line 27-2, the remaining air is prevented from flowing back to the cathode electrode 12.

As a result, when an amount of hydrogen cross leak from the anode electrode 11 to the cathode electrode 12 decreases, a decrease in an amount of cell voltage drop is prevented, and a cell voltage is lowered to a reduction potential or less, on the side of the cathode electrode 12, the oxide film formed on surfaces of Pt catalyst particles is removed due to the reduction reaction described in FIG. 5, and the catalyst is activated (Step S105).

Then, when an end time of the catalyst activation process of the fuel cell 10 has arrived (YES in Step S106), the control unit 25 ends the process.

Figure 9:
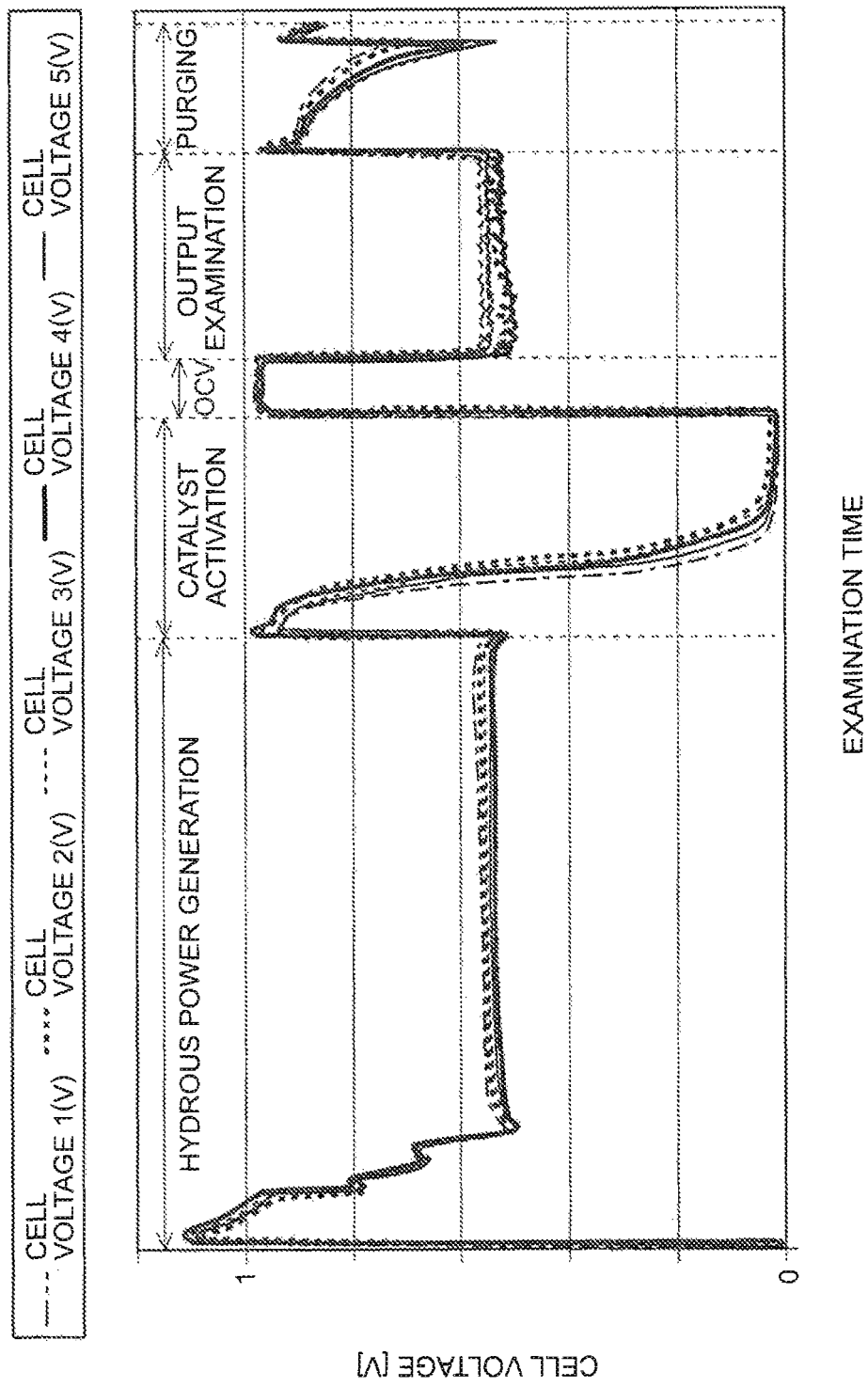
FIG. 9 is a diagram showing examples of cell voltages of five fuel cells when the catalyst activation method according to the present embodiment is applied to the catalyst activation process of a fuel cell.

Here, when the catalyst activation process is performed for five fuel cells 10 similar to those in FIG. 2 according to the method shown in FIG. 7 and FIG. 8, examples of cell voltages of the five fuel cells 10 in procedures of the power generation examining process are as shown in FIG. 9.

As shown in FIG. 9, when the catalyst activation process is performed according to the method shown in FIG. 7 and FIG. 8, it is confirmed that a cell voltage is dropped in all of the five fuel cells 10 during the catalyst activation process without flapping. In addition, since all of the five fuel cells 10 have a normal voltage waveform, the examination result is OK.

As described above, according to the present embodiment, first, hydrogen gas is supplied into the anode electrode 11, the side of the air supply line 26-2 of the cathode electrode 12 is sealed, and the side of the air exhaust line 27-2 of the cathode electrode 12 is opened to an atmosphere. Then, the side of the air exhaust line 27-2 of the cathode electrode 12 is sealed, and catalyst activation is performed in the cathode electrode 12.

Therefore, when the side of the air exhaust line 27-2 of the cathode electrode 12 is opened to an atmosphere, even if air discharged from the cathode electrode 12 to the air exhaust line 27-2 remains in the air exhaust line 27-2, the remaining air is prevented from flowing back to the cathode electrode 12. Thus, since an amount of hydrogen cross leak from the anode electrode 11 to the cathode electrode 12 decreases and a decrease in an amount of cell voltage drop is prevented, it is possible to lower a cell voltage to a reduction potential or less. As a result, in the cathode electrode 12, the oxide film formed on the surface of the catalyst can be removed due to a reduction reaction, and catalyst activation can be performed.

Here, the present disclosure is not limited to the embodiment, and can be appropriately modified without departing from the spirit and scope of the present disclosure. For example, while an example in which the present disclosure is applied to the power generation examining process of the fuel cell has been described in the embodiment, the present disclosure is not limited thereto. The present disclosure can be applied to any process in which hydrogen is supplied into an anode electrode, air is removed from a cathode electrode, a differential pressure is applied between the anode electrode and the cathode electrode, and catalyst activation is performed in the cathode electrode.

What is claimed is:

1. A method of activating a catalyst for a fuel cell in order to perform catalyst activation in a cathode electrode of the fuel cell, the method comprising:
a first process in which a control unit closes a hydrogen supply valve and a hydrogen exhaust valve and hydrogen is supplied into an anode electrode of the fuel cell, the control unit closes an air supply valve such that a side of an air supply line of the cathode electrode is sealed, and the control unit opens an air exhaust valve such that a side of an air exhaust line of the cathode electrode is opened to an atmosphere;
a second process in which the control unit closes the air exhaust valve such that the side of the air exhaust line of the cathode electrode is sealed after the first process; and
a third process following the second process in which an oxide film formed on a surface of the catalyst is removed due to a reduction reaction that occurs from a cell voltage being lowered to a reduction potential or less of the oxide film such that the catalyst is activated,
wherein the control unit maintains a closed state of the hydrogen exhaust valve during the first process through the third process.

2. The method according to claim 1, wherein, in the second process, after the first process, the control unit closes the air exhaust valve to seal the air exhaust line of the cathode electrode after a pressure on the side of the air exhaust line of the cathode electrode reaches a predetermined pressure or less.

* * * * *